United States Patent
Ortiz Cornet et al.

(10) Patent No.: US 8,422,682 B2
(45) Date of Patent: Apr. 16, 2013

(54) METHOD AND SYSTEM OF GENERATING IMMUTABLE AUDIT LOGS

(75) Inventors: Armando Ortiz Cornet, Barcelona (ES); Joan Miquel Bardera Bosch, Barcelona (ES)

(73) Assignee: Kinamik Data Integrity, S.L., Barcelona (ES)

( * ) Notice: Subject to any disclaimer, the term of this patent is extended or adjusted under 35 U.S.C. 154(b) by 939 days.

(21) Appl. No.: 12/096,048

(22) PCT Filed: Jul. 14, 2006

(86) PCT No.: PCT/IB2006/001948
§ 371 (c)(1), (2), (4) Date: Jun. 4, 2008

(87) PCT Pub. No.: WO2008/010006
PCT Pub. Date: Jan. 24, 2008

(65) Prior Publication Data
US 2009/0016534 A1    Jan. 15, 2009

(51) Int. Cl.
*H04L 9/00* (2006.01)
(52) U.S. Cl.
USPC .......................................... 380/277; 380/259
(58) Field of Classification Search .......... 380/259–266, 380/277; 726/1–36; 713/171
See application file for complete search history.

(56) References Cited

U.S. PATENT DOCUMENTS
5,978,475 A * 11/1999 Schneier et al. ............. 713/177
2007/0136814 A1* 6/2007 Lee et al. ...................... 726/25

FOREIGN PATENT DOCUMENTS
EP           1 243 999 A2      9/2002
WO    WO 2005/098564 A1    10/2005

OTHER PUBLICATIONS
International Search Report for PCT International Application No. PCT/IB2006/001948, mailed Jul. 11, 2007.

* cited by examiner

*Primary Examiner* — Jeffrey Pwu
*Assistant Examiner* — Helai Salehi
(74) *Attorney, Agent, or Firm* — RatnerPrestia

(57) ABSTRACT

A method to generate Immutable Audit logs (IAL) using related computer means and/or computer programs. This method and system processes audit information by cryptographic means generating one immutable digital chains that will contain at least the audit information split among the links and optionally encrypted, and this immutable digital chain is stored in a massive storage media. Each immutable digital chain is generated by including at every link at least the data resulting to apply a MAC function using a secret session key K over the result of information at current link concatenated with a previous link MAC value. The method proposes adding specific links to said immutable digital chain at regular defined intervals ('Metronome Entry') that contain at least a timestamp and the data resulting to apply a digital signature using a private key that is always kept secret over the metronome timestamp concatenated with previous link results.

11 Claims, 4 Drawing Sheets

METHOD AND SYSTEM OF GENERATING IMMUTABLE AUDIT LOGS

This application is a U.S. National Phase Application of PCT International Application No. PCT/IB2006/001948, filed Jul. 14, 2006.

FIELD OF THE INVENTION

The present invention relates to the art of centralized auditing of any kind of information received from heterogeneous sources maintaining tamper-resistant logs by use of cryptographic techniques and hardware implementing them.

BACKGROUND OF THE INVENTION

The vast majority of today's audit logs are mutable. This means that the information recorded can be changed or deleted by both authorized users (typically database administrators) within the system and by unauthorized users hacking into the system from inside or outside.

Specially on those well regulated environments, operating with large volumes of sensitive information, it is needed to guarantee the integrity of their data with a system that eliminates the risk of data manipulation.

In today's world, it is a fact that most administrations and private companies dealing with sensitive information lack of robust and cost efficient independent secure logs solutions. Typically, audit logs are maintained in the custody of one or more highly-privileged system user (system administrators) and these privileged users have rights to access and modify the logs: they can add, change, delete log entries. It also means that logs are also vulnerable to be tampered by a malicious party that gains administrator privileges.

The industry has been addressing these deficiencies by several means, including the use of WORMs (Write Once Read Many) devices, the use of digital signatures, redundant off-site storage managed by different people, etc., but all of them have aspects to demand a more efficient solution: WORMs are slower than any other storage device and one risk is that a drive can be replaced by another one tampered; digital signatures have a high computational cost that makes impossible to use standalone in systems with significant transaction volume and do not prevent the change of order; and duplicating the storage systems and administration have cost issues and difficult the further audit process.

The state of art is based today in the use of digital signatures (Public Key Infrastructure based) accompanied by an accurate date and time stamp to provide authenticity to the data susceptible of further audit but the following issues are not addressed:

a) In systems with significant transaction volume the performance required is not cost efficient or even it is directly not possible to implement because lack of performance of digital signatures.

b) Digital signatures and timestamps do not provide by themselves the guarantee that there have not been registers deletion without notice, which in fact means immutability is not a feature of such log registries.

The present invention addresses both issues, providing a cost efficient method and system even with significant transaction volumes guarantying immutability. The use of both symmetric message authentication hash functions to create the links and digitally signatures for chunks of links make possible to generate immutable digital chains in a cost efficient way by using standard industry hardware and software.

SUMMARY OF THE INVENTION

With the proposed invention the audit information that is recorded cannot be altered by anyone regardless of access privilege without creating clear evidence of what happened and when it happened: this is, logs become true immutable.

The invention proposes a centralized scalable immutable audit log server that can receive the audit information from multiple sources in an information sharing environment. The immutable audit log server processes such audit information and stores it in a way that assures the integrity of stamped record. The information could also be encrypted to assure confidentiality.

This invention uses digital signatures to provide authenticity to the audit logs and keyed hash functions to create a digital chain where all audit records are links. The algorithm proposed creates multiple parallel chains and digitally signs chunks of links instead of every single one to achieve high volume of transactions.

Symmetric session keys used at hash functions to create the digital chain are stored encrypted using the public key of the authorized auditor. An audit tool is presented to allow auditors to verify data integrity, decrypt the information and generate required audit reports. The use of PKI (Public Key Infrastructure) assures that only authorized auditors can get access.

BRIEF DESCRIPTION OF THE DRAWINGS

In FIG. 4 with a timer it is indicated the regular intervals at which metronomes entries are added to the digital chain. The audit information M, added to the link i, is concatenated to the authentication tag 105 obtained at previous link i−1 and the type 110 and a digital signature DS function is applied using a private key to obtain the authentication tag $h_i$.

DETAILED DESCRIPTION

Figure 1:
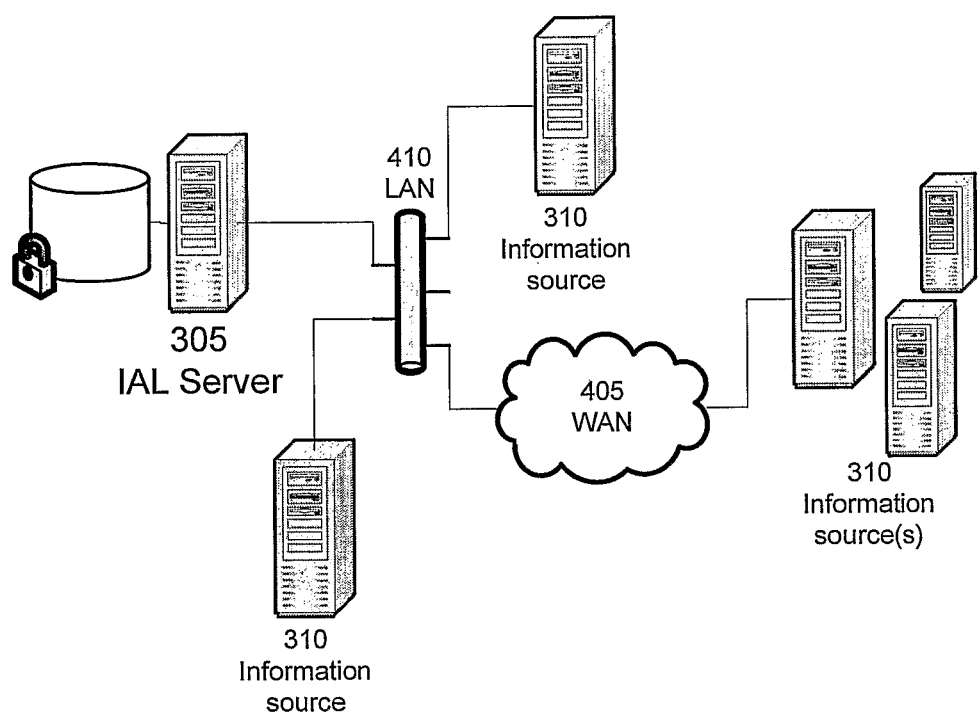
FIG. 1 is an illustration of an exemplary embodiment of a system in which the invention may be implemented. There are several information source(s) (310) that communicate with the IAL Server (305) through a Local Area Network (LAN, 410) and/or a Wide Area Network (WAN, 405).
Figure 2:
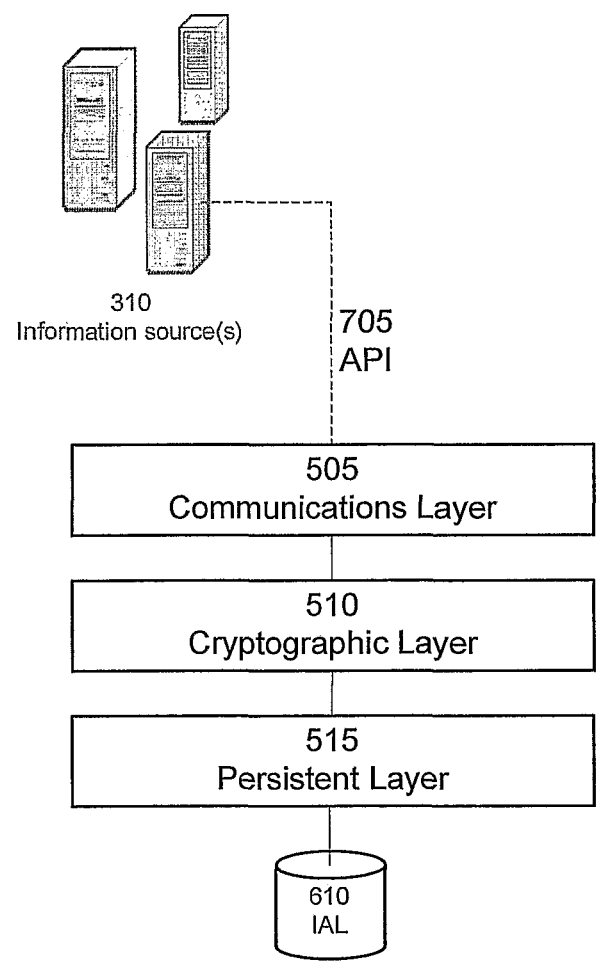
FIG. 2 is an illustration of a software architecture showing an exemplary implementation of the invention. There is a communications layer (505) that provides an API (705) to communicate with the information sources (310), a cryptographic layer (510) that generates the immutable audit chains and a persistent layer (515) that stores the immutable audit chains in a massive data storage creating the Immutable Audit Log (610).
Figure 3:
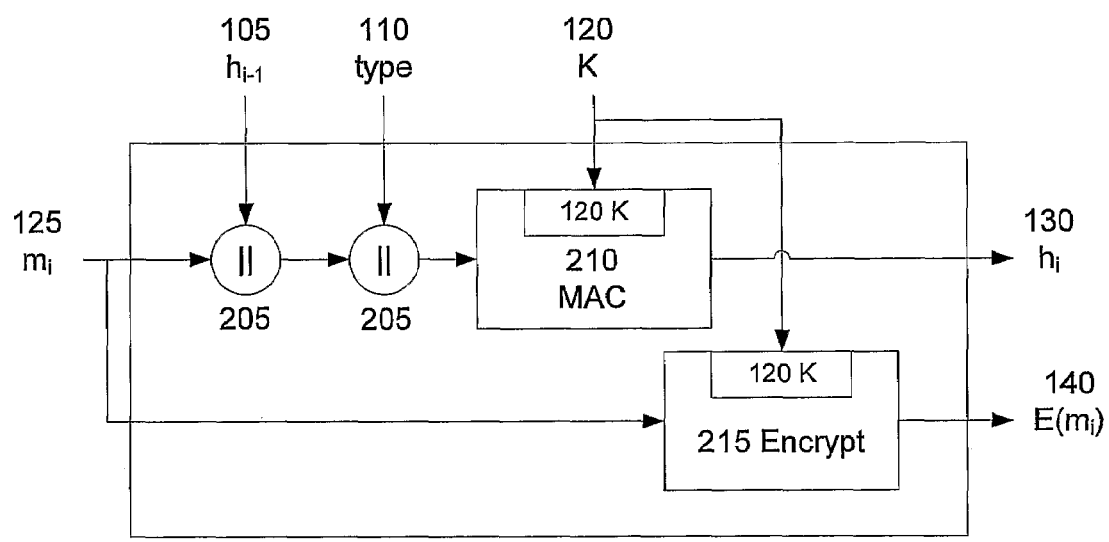
FIG. 3 shows how audit information links of the immutable digital chain are generated. The audit information $m_i$ (125) is added to the link i, optionally encrypted (215), as $E(m_i)$ where $E(m_i)=m_i$ if there is no encryption. Said audit information $m_i$ (125) added to link number i is at same time concatenated to the authentication tag $h_{i-1}$ (105) obtained at previous link i−1 and the type (110) and a MAC function (210) is applied using a session key K (120) to obtain the authentication tag $h_j$ that is also added to the link i.
Figure 4:
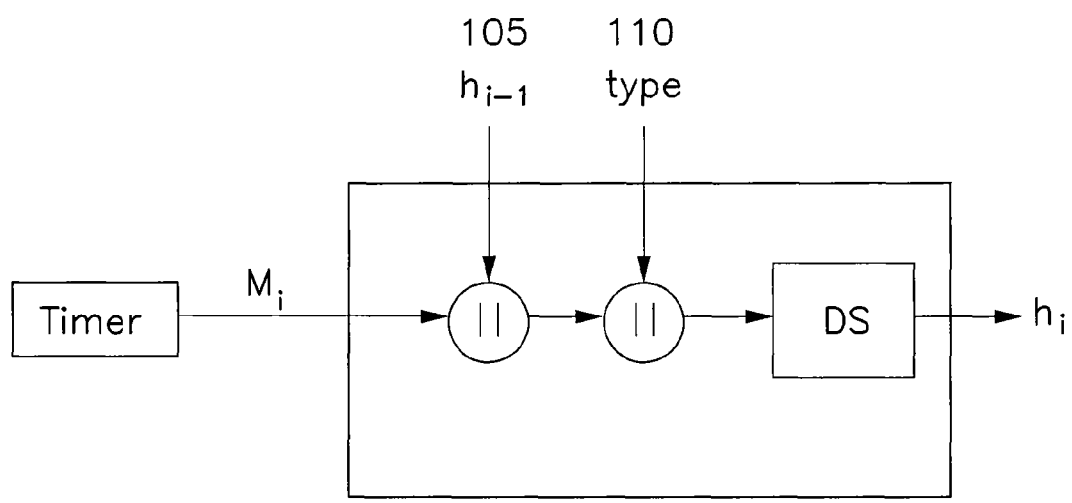
FIG. 4, similar to FIG. 3, shows how metronome entries are added to the digital chain at predefined regular intervals.

The present invention proposes to generate immutable audit logs from audit information provided by one or more information sources. It is proposed an independent unit, the Immutable Audit Log server (IAL server), involving the following steps:

a) receiving the audit information to store. An API (Application Programming Interface) is provided to enable the communication with the different audit information sources;
b) processing the audit information applying cryptographic routines to generate one or more immutable digital chains that contain at least the audit information split among the links, optionally encrypted; only authorized auditors will be able to verify integrity of the immutable digital chain and access the audit data; and
c) storing said digital chain(s) in a massive storage media, such as a hard drive, WORM, Storage Area Network (SAN), etc.

The system described herein is preferably implemented as a software program platform independent Java implementation running in a standard hardware independent server. However, the system may be implemented in various embodiments using other well known implementations, such as, for example, Microsoft's .net technology or C++. The executable applications, as described herein, are computer programs (software) stored within the main memory or a secondary memory on any suitable computer running preferably Linux or Windows. Such computer programs, when executed, enable a processor to perform the features of the present invention. The system as disclosed herein can be implemented by a programmer, using commercially available development tools. Obviously, as technology changes, other computers and/or operating systems may be preferable in the future. In a preferred embodiment, the use of an industry standard Hardware Security Module (HSM) to run at least the software routines in charge to generate the immutable digital chains provides even a higher degree of security.

The system is proposed in a 3-tier software architecture: 1) the client or communications tier, which is in charge of the connection with audit data sources; 2) the business or cryptographic tier, which is in charge to generate the immutable digital chains; 3) and the persistent data storage tier in charge to store the data in a persistent storage, mainly a database but it could also be server side files or any other legacy data stores.

Designing the application in layers, or tiers, is useful for many different reasons. In a multiple tier design, each tier can be run a separate machine, or machines, allowing for improved processing performance. Depending on the design, multiprocessor machines, or many different independent computers can be used to improve performance. Efficient layering can give structure to the application, promote scalability, and ease long-term maintenance requirements for the code.

Connection with the Audit Data Sources

To receive the audit information to store, the IAL server provides an Application Programming Interface. At least two levels of communication standards are defined:
a) The transport protocol to connect the audit information sources with the IAL. The invention proposes as network transport protocol to use standard HTTPS TLS/SSL calls over TCP/IP where both the IAL server and the audit information sources are node-to-node authenticated with trusted certificates. Other communication protocols such as syslog, secure syslog, etc., can be used as well.
b) The format and content of the messages sent/received with the audit information. Several well known standard data communication protocols can be used to send/receive the information, such as SOAP, Burlap, Hessian, HTTP Invoker and RMI.

Generating Immutable Digital Chains

Definitions

Messages $m_0$ to $m_n$: We'll call Message to the audit data information provided at any call to the IAL server in order to be stored securely.
Entry: Tuple of values such as a Message, a Timestamp, a link and the type of the Message, etc.
Register: Ordered set of entries
h: hash function
$P_{Aud}$: Encryption with the Auditor's public key
a $S_{IAL}$: Encryption with the IAL server's private key
$DS_{IAL}$: digital signature made by IAL, so $DS_{IAL}(X)=S_{IAL}(h(x))$
ts: timestamp
$\|$: concatenation
MAC: (Message Authentication Code) is an authentication tag derived by applying an authentication scheme, together with a secret key, to a message. Unlike digital signatures, MACs are computed and verified with the same key, so that they can only be verified by the intended recipient. There are four types of MACs: (1) unconditionally secure, (2) hash function-based, (3) stream cipher-based or (4) block cipher-based.
Keyed hash: hash function-based MAC
HMAC: hash function-based MAC The immutable digital chains according to this invention are generated following the cryptographic protocol defined below:
1. The IAL server establishes at least one session key (symmetric key) that will arrive to the Auditor in a secure way encrypted using public-key cryptography:
   1.1. The IAL server generates randomly a session key, K.
   1.2. The IAL server destroys securely the old previous session key (if it exists).
   1.3. The IAL server encrypts the new key with the Auditor's public key ($P_{Aud}$), obtaining $K'=P_{Aud}(K)$
   1.4. The IAL server produces a one-way hash of the encrypted key K', obtaining $H=h(K')$ and encrypts the hash using its own private key $S_{IAL}$. In other words it digitally signs the encrypted key K' obtaining $K''=S_{IAL}(H)=DS_{IAL}(K')$
   1.5. The IAL server adds to the digital chain the K', the K'', a timestamp, the constant 1, and the digital signature of all previous data. This is $entry_0=(m_0,ts,DS_0=S_{IAL}(h(m_0\|t_s\|1)),1)$ where $m_0=P_{Aud}(K)$
2. The second entry in the digital chain has the type 3 of 'Metronome Entry' and is formed with a tuple of at least four values: $m_1$, the timestamp ts, the link with previous entry formed as the result to digitally sign said two elements $m_1$ and ts together with previous link digital signature $DS_0$; and the type t, (the constant 3) according the formula $entry_1=(m_1,ts,h_1=S_{IAL}[h(m_1\|ts\|DS_0\|3)],3)$ where $m_1$ is formed by at least a chain identifier. Metronome entries are added to the digital chain at predefined regular intervals, providing by this way digital signatures to the chunk of messages contained in the digital chain between one metronome entry and the previous one in the chain.
3. Every message $m_i$ containing audit data is added to the digital chain preserving the sequence order. Every added entry is derived to form the chain from the previous entry $entry_{i-1}$ according to the formula: $entry_i=(m_j,ts,h_i=MAC_K(m_i\|ts\|h_{i-1}\|4)$, 4) where the value 4 corresponds to the entry's type ('Message Entry').

4. As seen, the session key is used to compute a cryptographic message authentication code (MAC) for the entry to register and the MAC of the previous entry each time an entry is added to a digital chain. It is possible to change the session key after a predefined time or a predefined number of iterations and start using a new one as defined at step 1, to provide another level of security.

5. The register would have no end being an infinite chain if it will never be stopped (for example if the server needs maintenance). Then, it is securely closed by creating a special final entry$_N$ of type 'Graceful Close Entry'. The IAL server forms this final entry with a tuple of at least four elements: $m_N$, the timestamp ts, the link with previous previous entry N−1 by digitally signing said elements $m_N$ and ts together with previous link hash $h_{N-1}$; and the constant 2 as $t_N$: entry$_N$=($m_N$,ts,$h_N$=$S_{IAL}$[h($m_N$||ts||$h_{N-1}$||2)],2) where $m_N$ at least contains the chain identifier.

In a system using encryption, all entries' messages, $m_1$ to $m_n$, are encrypted using a symmetric encryption algorithm with key K (the message $m_0$ will never be encrypted, because $m_0$ is the key already encrypted with the Auditor's public key). In a preferred embodiment, AES is the encryption algorithm, but others can also be used, such as DES, 3DES, IDEA, etc.

When the Auditor receives a register to audit, he can check its integrity and validate it using the session keys and verifying the digital signatures using the public key of IAL server. The authorized Auditor can obtain the session keys used by decrypting them using his private key, and thus verify the whole audit register.

All session keys for symmetric encryption have been encrypted under the Auditor's public key and digitally signed using the IAL server private key (see section 3.1). The Auditor can obtain the session keys by processing sequentially the register. Every time the Auditor finds an entry of type 'New Key Entry', it can obtain the session key and check its integrity by verifying its digital signature.

The Auditor verifies each entry according to its type and its position in the chain, recreating the same process followed during its generation and verifying MACs and digital signatures. The entries are verified preserving the sequence order.

If the system is compromised, the attacker has no way to recreate the MACs (the only way is to know the session key) so he can't modify it without detection. Later, the authorized Auditor will use the session keys to recreate the digital chain and check whether the entries are or aren't still intact.

Consider what happens if an attacker chooses to simply delete or truncate a register rather than attempting to modify existing entries without detection. Of course, no new valid entries can be added once a register has been truncated, since intermediate links will have been lost, and this will be detected during verification.

Consider now an attacker that deletes entries from the end of the register; in this scenario, the lack of new entries could suggest the authorized Auditor that the system is still secure and what is happening is that no data have been received recently. The use of metronome entries prevents this kind of attacks: metronome entries are special register entries which are made at regular intervals. If an attacker deletes entries from the end he will also delete the metronome entries or if he leaves the metronome entries, their digital signatures will not match and the authorized Auditor will be able to detect the situation (where the last valid entry indicates the earliest time at which the register could have been truncated).

In the case of a dishonest Auditor, the session key gives the ability to falsify register entries, but as there are periodic digital signatures of the records, this kind of attack will also be detected because even though the MACs verification won't show errors, the verification of the digital signature will.

An optional improvement considers same method but securing multiple concurrently maintained digital chains to reduce latency and take a better advantage of computational load. The IAL sever will establish as many concurrent different session keys as registers. Each register is independent of the other ones and works in an independent way. But, in order to detect the removal of a whole register, all registers are securely linked in a chain at creation time. In this way, a register cannot be entirely deleted without detection. Additionally, metronome entries are added to all current registers at the same time, so all registers should have the same number of metronome entries. Metronome entries added at the same time have the same identifier value (it simplifies detecting truncation). Later, the authorized Auditor can validate that these metronome entries are present at verification time.

The use of an industry standard Hardware Security Module (HSM) where at least the pair of private & public keys for digital signatures are generated, guarantees the immutability of the digital chain because nobody can access the private key used to sign, even those privileged users such as the system administrators.

The IAL server public key can be certified by a trusted $3^{rd}$ party or even by the Auditor's organization to guarantee nobody will supplant the IAL server and generate fake audit logs An industry standard Hardware Security Module (HSM) or a smart card or a USB token is used to generate at least one private key, kept it always secret, and use it to calculate and add digital signatures at least to one of said one or more immutable digital chains.

Storing the Immutable Digital Chain(s) in a Massive Storage Media

The persistent data tier is in charge to store the immutable digital chain(s) that are being generated. In a simple implementation the immutable digital chain(s) will be stored in files at server's hard drive but in a preferred implementation the immutable digital chain(s) will be stored in a database that could use same server's hard drives but also external storage such as Network Attached Storage (NAS, typically a cabinet with hard drives directly attached to the server or by fiber channel). Files and database can moreover be stored on a WORM device, optionally.

The present invention may be embodied in other specific forms without departing from its basic characteristics and the described embodiments are to be considered in all respects only as illustrative and not restrictive. The scope of the invention is, therefore indicated by the appended claims.

The invention claimed is:

1. A system to generate Immutable Audit Logs from one or more audit information sources, comprising at least one independent server (IAL server) hosting a software program, performing the following functions:
   a. receiving audit information from at least one source by means of an API (Application Programming Interface) that is provided to enable the communication between said IAL server and said audit information source(s) through a communications network;
   b. processing the audit information applying cryptographic routines to generate one immutable digital chain that contains at least the audit information such that only authorized auditors will be able to verify integrity of the immutable digital chain and access the audit data; and c. storing said chain in a mass storage media comprising at least one of a hard drive, a WORM or a Storage Area Network (SAN), wherein said immutable digital chain is generated by including at every link at least the data resulting to apply an HMAC function using a secret session key K over the result of information at current link concatenated with previous link HMAC value, so that link, will contain at least $HMAC_K$ (information of link$_i$ operated with $h_{i-1}$) where $h_{i-1}$ is $HMAC_K$ (data of link$_{i-1}$ concatenated with $h_{i-2}$), said IAL server comprising at least a timer for adding specific links to said immutable digital chain at regular defined intervals ('Metronome Entry') that contain at least a timestamp and the data resulting to apply a digital signature using a private key that is always kept secret over the metronome timestamp concatenated with the previous results, and wherein a first entry of said immutable digital chain contains at least said secret session key K encrypted with the public key of an authorized auditor and digitally signed by a private key so that an auditor can benefit from the guaranteed presence at said regular defined intervals of entries that contain at least a timestamp that is digitally signed.

2. The system according to claim 1 wherein the communication between the IAL server(s) and the information source font(s) uses as transport protocol standard HTTPS TLS/SSL calls over TCP/IP where both the IAL server and the audit information sources are node-to-node authenticated with trusted certificates.

3. The system according to claim 1 wherein the communication between the IAL server(s) and the information source font(s) uses as transport protocol standard syslog or secure syslog calls over TCP/IP.

4. The system according to claim 1 wherein one of a Hardware Security Module (HSM), a smart card or a USB token is used to generate at least one private key, which is always kept secret, and used to calculate and add digital signatures at least to one of said one or more immutable digital chains.

5. The system according to claim 1 wherein one of a Hardware Security Module (HSM) is used at least to generate and keep secure the cryptographic keys used in the method.

6. The system according to claim 1 wherein the immutable audit chains are stored as files in the IAL server hard drive or on an external mass storage media.

7. The system according to claim 1 wherein the immutable audit chains are stored in a database in the IAL server hard drive or an external mass storage media.

8. A method to generate Immutable Audit logs (IAL) using related computer means and/or computer programs comprising:

a. receiving the audit information from multiple sources, over a communication network;

b. processing the audit information by cryptographic means generating one immutable digital chain that will contain at least the audit information split among the links, optionally encrypted; and c. storing the immutable digital chain in a massive storage media, said immutable digital chain being generated by including at every link at least the data resulting to apply a MAC function using a secret session key K over the result of information at current link concatenated with previous link MAC value, so that link will contain at least $MAC_K$ (information of link operated with $h_{i-1}$) where hi$_{-1}$ is $MAC_K$ (data of link$_{i-1}$ concatenated with $h_{i-2}$), a first entry of said immutable digital chain containing at least said secret session key K encrypted with the public key of an authorized auditor and digitally signed by a private key; and wherein specific links are added to said immutable digital chain at regular defined intervals ('Metronome Entry') that contain at least a timestamp and the data resulting to apply a digital signature using a private key that is always kept secret over the metronome timestamp concatenated with previous link results, so that an auditor can benefit from the guaranteed presence at said regular defined intervals of entries that contain at least a timestamp that is digitally signed.

9. The method according to claim 8 wherein the applied MAC function is an H-MAC (keyed-hash) function.

10. The method according to claim 8 wherein a Hardware Security Module is used at least to generate and keep secure the cryptographic keys.

11. The method according to claim 9 wherein a Hardware Security Module is used at least to generate and keep secure the cryptographic keys.

* * * * *